United States Patent [19]

Busch-Sørensen

[11] Patent Number: 5,672,328

[45] Date of Patent: Sep. 30, 1997

[54] METHOD AND APPARATUS FOR REMOVING SILVER IN THE FORM OF SILVER SALTS FROM A LIQUID

[75] Inventor: Thomas Busch-Sørensen, Holte, Denmark

[73] Assignee: Eskofot A/S, Ballerup, Denmark

[21] Appl. No.: 916,007

[22] PCT Filed: Feb. 8, 1991

[86] PCT No.: PCT/DK91/00038

§ 371 Date: Aug. 5, 1992

§ 102(e) Date: Aug. 5, 1992

[87] PCT Pub. No.: WO91/12565

PCT Pub. Date: Aug. 22, 1991

[30] Foreign Application Priority Data

Feb. 8, 1990 [DK] Denmark .................. 0336/90

[51] Int. Cl.⁶ .................................. B01J 19/12
[52] U.S. Cl. .................. 423/561.1; 423/37; 423/48; 422/186.3; 204/157.15
[58] Field of Search ................... 423/566, 566.1, 423/37, 47, 561.1, 48; 204/157.15; 422/186.3

[56] References Cited

U.S. PATENT DOCUMENTS 3,865,714  2/1975  Warner ..................... 208/238
4,088,552  5/1978  Morrison et al. ........... 204/157.1 R
4,857,204  8/1989  Joklik ..................... 210/695

FOREIGN PATENT DOCUMENTS 0159842  10/1985  European Pat. Off.
0265940   5/1988  European Pat. Off. ........ C22B 11/04
2081795   1/1975  France .................... C22B 11/00
333249    3/1971  Sweden ................... C22B 11/00

*Primary Examiner*—Michael Lewis
*Assistant Examiner*—Timothy C. Vanoy
*Attorney, Agent, or Firm*—Cushman Darby & Cushman Intellectual Property Group of Pillsbury Madison & Sutro LLP

[57] ABSTRACT

By using a method of removing silver in the form of sparingly soluble silver salt, especially silver sulfide, from a solution containing another silver compound, such as a silver thiosulfate complex in a photographic fix or rinsing fluid by precipitation, the solution is subjected to electromagnetic irradiation with a wavelength below 375 nm. The irradiated liquid is led through a filter-like means 33 which binds the silver sulfide to its surface as crystalline silver sulfide. As a result, the silver sulfide is precipitated and deposited on the surface of the means as solid silver sulfide which in its turns acts as a catalyst for further precipitation and depositing of solid silver sulfide on the surface of the means. By binding the solid silver sulfide to the surface of the means, the required capacity of a possible subsequent filter is reduced.

5 Claims, 1 Drawing Sheet

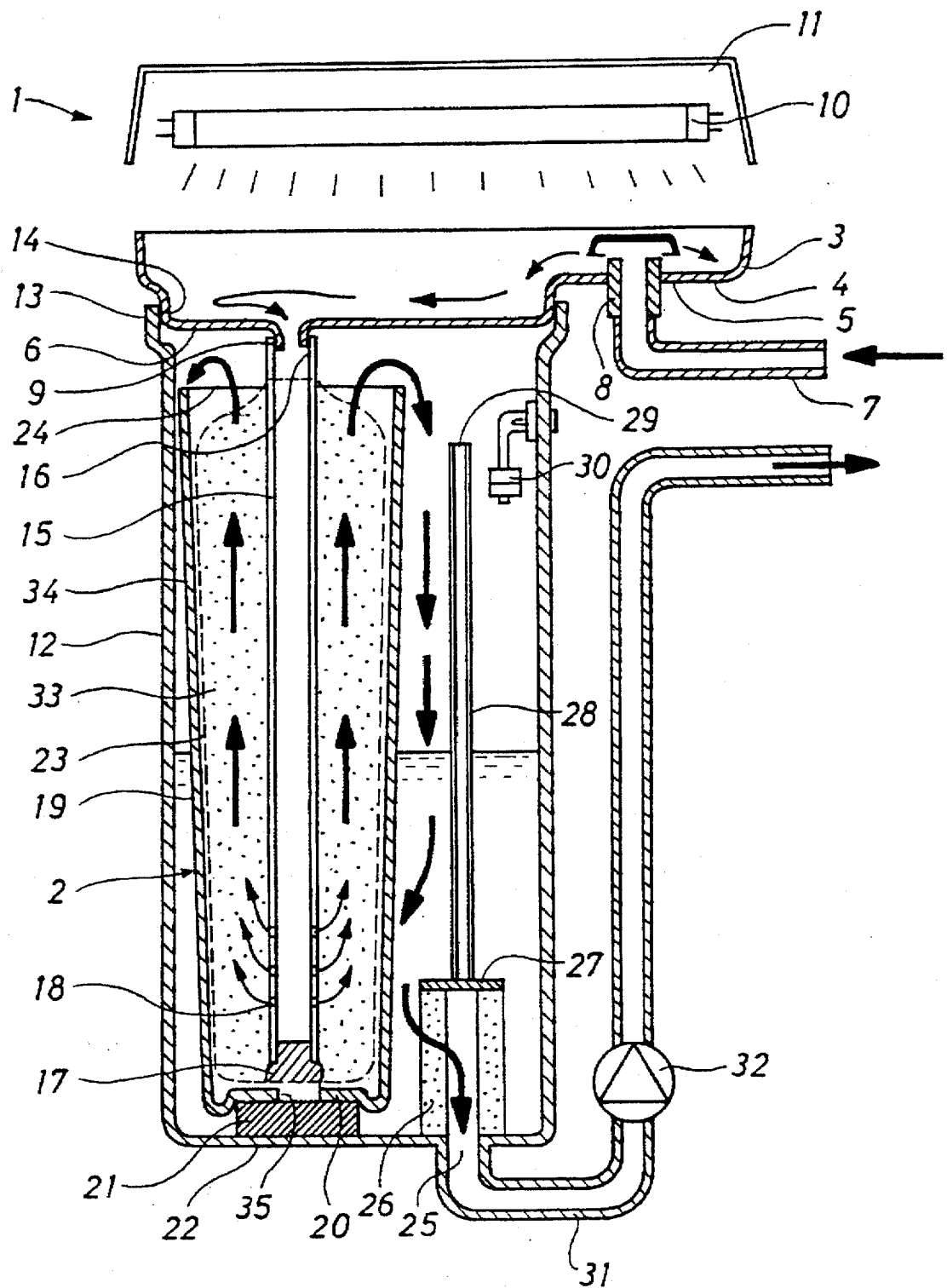

METHOD AND APPARATUS FOR REMOVING SILVER IN THE FORM OF SILVER SALTS FROM A LIQUID

REFERENCE TO RELATED APPLICATION

This results from a national stage application under 35 USC § 371, of PCT/DK/91/00038, filed Feb. 8, 1991.

1. Technical Field

The invention relates to a method for removing silver in the form of silver sulfide from a solution containing a silver thiosulfate complex in a photographic fix or rinsing fluid solution by means of preparation, which method comprises subjecting said solution to electromagnetic radiation with a wavelength of 375 nm or less.

2. Background Art

U.S. Pat. No. 4,088,552 discloses the conversion of silver thiosulfate complexes in a liquid into silver sulfide by irradiating a liquid by means of UV radiation or other high-energy radiation. Said patent specification discloses how by irradiation of the liquid with a relatively large amount of energy it is possible to precipitate silver sulfide as a solid matter which is subsequently removed by filtering. It is stated by way of example that by irradiating 50 g of fix solution with 1200 g UV radiation for 12 minutes 90% of the silver will precipitate. It is further described how by irradiating liquids containing silver thiosulfate complexes with electron radiation from a 0.3 to 2 MW accelerator an almost momentary precipitation of silver sulfide is achieved. None of the above methods are however suited for conventional use because of the very large amount of energy necessary to carry out the methods.

DISCLOSURE OF THE INVENTION

The object of the invention is to provide a method of the type mentioned above which enables a rapid and safe removal of silver compounds from a photographic solution while using only small amounts of energy.

The method according to the invention is characterised in that the liquid is irradiated with such an amount of energy that substantially no crystalline silver sulfide is formed and in that the irradiated liquid is passed through a filter-like means which binds the silver sulfide to its surface as crystalline silver sulfide. As a result, the silver sulfide is precipitated and deposited on the surface of the means as solid silver sulfide which in its turn acts as a catalyst for further precipitation and depositing of solid silver sulfide on the surface of the means. By binding the silver sulfide to the surface of the means, the required capacity of a possible subsequent filter is reduced.

A filter-like means is broadly to be understood as a means by which the relationship between the surface area in contact with the liquid and the flow area is large or expressed differently a means with a very large surface.

It has surprisingly been found that by irradiating a rinsing fluid containing silver thiosulfate complexes by means of UV light at for instance 254 nm and by using energy levels in the order of 1% of the levels stated in U.S. Pat. No. 4,088,552, the silver thiosulfate solution is substantially completely converted into an oversaturated solution of silver sulfide in which substantially no silver sulfide is found in solid form. Tests have thus shown that by filtering the irradiated liquid through a 1 micrometer filter immediately after the irradiation, substantially no silver sulfide will be removed by filtering.

Furthermore according to the invention the liquid may be filtered after having passed through the means. Crystalline silver sulfide, which has not been deposited on the means or which has been detached therefrom, is thereby removed from the liquid.

In addition, according to the invention the means may be formed of a granular or fibrous material. In practice said embodiment has proved especially advantageous for obtaining a very large surface.

Further according to the invention the means may be of glass. Said embodiment has proved particularly advantageous in practice, especially when the means comprises glass wool.

The apparatus according to the invention for carrying out the method according to the invention and which comprises a irradiation means adapted to irradiate a liquid by means of electro magnetic radiation to convert silver thiosulfat dissolved in the liquid into silver sulfide and which apparatus has an outlet for the irradiated liquid is characterised in that the outlet of the irradiation means is connected to an inlet associated to a crystallization device, said crystallization device further comprising a housing with a flow passage in which a filter-like means is placed, said filter-like means binding the silver sulfide to its surface, and an outlet for liquid from which silver has been removed.

According to a preferred embodiment of the invention the inlet of the crystallization device is situated at a first end of a tube which has a closed second end and near the latter at least one outlet opening, that the housing encircles the tube at a radial distance thereto and that the filter-like means is placed between the tube and the housing, the outlet of said housing being situated near the same end as the inlet. This above embodiment has proved especially advantageous in practice.

Finally according to the invention the filter-like means may be an interchangeable cartridge comprising glass wool. As it has been found that glass has a particularly good ability to increase the depositing and crystallization of silver sulfide and as glass wool also has a very large surface, said material is very suitable. Glass wool also being rather inexpensive and easy to handle and having large chemical resistance, it is advantageous to form said material into a cartridge to be interchangeably placed in the housing. When a predetermined amount of silver sulfide has been deposited in the cartridge, it is removed from the housing and replaced by a new one. It is thereby possible to choose to discard the used cartridge or to reuse the cartridge after having removed the silver sulfide by rinsing with an acid.

BRIEF DESCRIPTION OF DRAWINGS

The invention is explained in more details below with reference of the accompanying drawing in which the FIGURE illustrates an apparatus for carrying out the method according to the invention of removing silver sulfide from a photographic fix or rinsing fluid containing a silver thiosulfate complex.

BEST MODE FOR CARRYING OUT THE INVENTION

The apparatus comprises an irradiation means 1 for irradiating a photographic fix or rinsing fluid containing silver salts with electro magnetic radiation and a crystallization device 2 placed below the irradiation means for precipitation and crystallization of sparingly soluble silver salt formed by irradiation.

The irradiation means 1 comprises a low vessel or tray 3 with a stepped bottom 4 formed by an upper bottom portion 5 and a lower bottom portion 6. The liquid to be treated, and which may be rinsing fluid from the rinsing vessels of a photographic developing apparatus, is fed to the vessel through a feeding line 7 connected to an inlet 8 in the upper bottom portion 5. The irradiation means 2 further has an outlet 9 in the lower bottom portion 6 of the vessel 3.

A number of UV lamps 10 are placed above the vessel 3, for instance low pressure mercury tubes emitting ultraviolet light with a wavelength of substantially 254 nm. These lamps 10 are surrounded by a reflector 11 at the top and to the sides to make better use of the emitted light.

The liquid flow into the vessel 3 through the inlet 8, flows over the bottom 4 of the vessel 3 while being evenly distributed thereon and then out through the outlet 9. The influx of liquid is controlled in such a manner in relation to the quantity of light emitted that when the liquid flows from the inlet 8 to the outlet 9, a substantially complete conversion of the silver thiosulfate complexes present in the liquid into silver sulfide takes place. Further, said control is preferably carried out in such a manner that substantially no crystalline silver sulfide is formed, but on the contrary, an oversaturated solution of silver sulfide.

The crystallization device 2 is placed below the irradiation means 1 inside a container 12 having an upper rim 13, releasably engaging the outer periphery 14 of the lower bottom portion 6 of the low vessel or tray 3.

The crystallization device 2 comprises a vertical tube 15 with an upper open end 16, said open end forming the inlet 2 of the crystallization device and releaseably engaging the outlet 9 and the vessel 3.

the tube 15 has a lower end, which is closed by means of a plug 17 and is near its lower end provided with a number of outlet openings 18. Furthermore, the tube 15 is placed centrally inside a cylindrical housing 19, the plug 17 resting on the bottom 20 of the housing, said bottom 20 in its turn resting on the bottom 22 of the container 12 via an intermediary layer or cushion 21. The bottom 20 of the housing 19 is provided with an opening 35 which is closed by the intermediary layer 21 in such a manner that at conventional use the housing 19 is water-tight. By lifting the housing 19, said housing 19 is emptied through the opening 35, whereby the crystallization device 2 is more easily lifted out of the container 12. Glass wool 33 has been provided between the cylinder wall 23 of the housing 19 and the tube 15. The tube 15, the plug 17 of said tube and the glass wool are wrapped in a filter bag and jointly said parts form an interchangeable cartridge. The housing 19 is open at the top thereby forming an outlet 24 for liquid which has passed through the crystallization device 2.

From the outlet 9 of the vessel 3 the irradiated liquid flows downwards through the tube 15 and via the outlet openings 18 near the lower end thereof. From here the liquid flows through the glass wool towards the outlet 24 at the upper end of the housing 19 and the tube 15, respectively. While passing through the glass wool 33, the silver sulfide in the oversaturated solution of silver sulfide is deposited and crystallized as a solid substance on the surface of the fibres of the glass wool and when the liquid reaches the outlet, the silver sulfide is substantially precipitated. Precipitated silver sulfide which has not been deposited on the glass wool or which has been detached, is held back by the filter bag 34. From the outlet 24 the liquid flows into the container 12. The container 12 is provided with an outlet 25 in the bottom 22 and a cylindrical filter 26 is placed around the outlet inside the container thereby removing solid silver sulfide possibly carried along in the liquid. At the top the cylindrical filter 26 is closed by means of a plate 27, wherein an overflow pipe 28 is provided, said overflow pipe communicating with the interior of the filter 26 and extending upwards in the container 12 to a distance below the outlet 24 of the crystallization device. Furthermore, a level sensor 30 is placed inside the container immediately below the upper end 29 of the overflow pipe, said level sensor providing a control or alarm signal when the level of liquid in the container 12 reaches a predetermined level. At the same time, the overflow pipe 28 ensures that the level of liquid in the container 12 is never above the level of the upper end of the overflow pipe 28, as in that case the liquid will flow directly out through the outlet 25 via the overflow pipe 28 and the interior of the cylindrical filter 26. The outlet 25 of the container 12 is connected to a discharge pipe 31 for discharging the treated liquid may be fed back to the fix or rinsing fluid vessel from where it was originally removed.

The invention may be varied in many ways without thereby deviating from the scope thereof. Thus glass beads, sintered glass dust or granules etc and/or other materials than glass capable of binding silver sulfide to its surface and which has a large surface may be used as filter-like material.

I claim:

1. A method for removing silver in the form of silver sulfide from a solution containing a silver thiosulfate complex in a photographic fix or rinse fluid solution by means of precipitation, which method comprises subjecting said solution to electromagnetic radiation with a wavelength of 375 nm or less, such that the liquid is irradiated with such an amount of energy that substantially no crystalline silver sulfide is formed and in that the irradiated liquid is passed through a filter means which binds the silver sulfide to its surface as crystalline silver sulfide.

2. The method according to claim 1, wherein the liquid is filtered after having passed through the means.

3. The method according to claim 1, wherein the filter means is formed of a granular or fibrous material.

4. The method according to claim 1, wherein the filter means is glass.

5. An apparatus, comprising:

an irradiation means adapted to irradiate a liquid by means of electro magnetic radiation to convert silver thiosulfate dissolved in the liquid into silver sulfide and which means has an outlet for the irradiated liquid, such that the outlet of the irradiation means is connected to an inlet associated to a crystallization device, said crystallization device further comprising a housing with a flow passage in which a filter means is placed, said filter means binding the silver sulfide to its surface, and an outlet for liquid from which silver has been removed; the inlet of the crystallization device being situated at a first end of a tube which has a closed second end and at least one outlet opening near the closed second end, the housing encircling the tube at a radial distance thereto, and the filter means being placed between the tube and the housing, the outlet of said housing being situated near the same end as the inlet.

* * * * *